United States Patent [19]

Kuramochi et al.

[11] Patent Number: 5,959,002
[45] Date of Patent: Sep. 28, 1999

[54] COATED GRANULAR CURING AGENT FOR A RADICALLY CURABLE COMPOUND AND ANCHOR BOLT-FIXING COMPOSITION COMPRISING THE SAME

[75] Inventors: Hidenori Kuramochi; Nobuhiro Takeda, both of Nobeoka, Japan

[73] Assignee: Asahi Kasei Kogyo Kabushiki Kaisha, Osaka, Japan

[21] Appl. No.: 08/849,328

[22] PCT Filed: Dec. 5, 1996

[86] PCT No.: PCT/JP96/03556

§ 371 Date: Jun. 2, 1997

§ 102(e) Date: Jun. 2, 1997

[87] PCT Pub. No.: WO97/20864

PCT Pub. Date: Jun. 12, 1997

[30] Foreign Application Priority Data

Dec. 6, 1995 [JP] Japan .................................. 7-318286
Aug. 14, 1996 [JP] Japan .................................. 8-214803

[51] Int. Cl.⁶ ............................. C08K 9/10; C08F 4/32; C09J 133/00
[52] U.S. Cl. ..................... 523/176; 523/200; 523/211; 526/227; 526/230; 525/936; 428/407
[58] Field of Search ..................... 523/176, 200, 523/211; 526/227, 230; 525/936; 428/407

[56] References Cited

U.S. PATENT DOCUMENTS

| | | | |
|---|---|---|---|
| 2,969,330 | 1/1961 | Brynko | 428/402.22 |
| 3,814,156 | 6/1974 | Bachmann et al. | 523/176 |
| 3,925,996 | 12/1975 | Wiggill | 405/259.6 |
| 4,216,180 | 8/1980 | Seemann et al. | 264/35 |
| 4,387,044 | 6/1983 | Sanchez et al. | 526/230 |
| 4,898,899 | 2/1990 | Isobe | 524/90 |
| 5,409,764 | 4/1995 | Otsuki et al. | 428/221 |
| 5,551,805 | 9/1996 | Arnold et al. | 405/259.6 |
| 5,589,523 | 12/1996 | Sawaoka et al. | 523/211 |

FOREIGN PATENT DOCUMENTS

| | | |
|---|---|---|
| 0150555 | 8/1985 | European Pat. Off. . |
| B5432480 | 10/1979 | Japan . |
| B6313000 | 3/1988 | Japan . |
| B0041160 | 1/1992 | Japan . |
| A6173354 | 6/1994 | Japan . |
| A8277818 | 10/1996 | Japan . |
| A8284599 | 10/1996 | Japan . |

*Primary Examiner*—Tae Yoon
*Attorney, Agent, or Firm*—Birch, Stewart, Kolasch & Birch, LLP

[57] ABSTRACT

Disclosed is a coated granular curing agent, which is for use in curing at least one first radically curable compound selected from the group consisting of a radically curable resin and a radically polymerizable monomer and which comprises an organic peroxide granule, wherein the organic peroxide granule has an entire surface thereof coated with a layer of a cured resin derived from at least one second radically curable compound selected from the group consisting of a radically curable resin and a radically polymerizable monomer, and wherein the first and second radically curable compounds are the same or different. The coated granular curing agent of the present invention is advantageous not only in that the curing agent can be handled with ease, but also in that the curing agent can be uniformly dispersed in a radically curable compound, so that it exhibits excellent curing performance. Therefore, the coated granular curing agent of the present invention can be advantageously used to provide a one-pack type anchor bolt-fixing composition which is not only capable of stably fixing an anchor bolt to a base while enjoying high fixation strength, but also can be stored at room temperature for a period of time as long as 1 month or longer without suffering any degradation.

14 Claims, 3 Drawing Sheets

COATED GRANULAR CURING AGENT FOR A RADICALLY CURABLE COMPOUND AND ANCHOR BOLT-FIXING COMPOSITION COMPRISING THE SAME

BACKGROUND OF THE INVENTION

1. Field of The Invention

The present invention relates to a coated granular curing agent and an anchor bolt-fixing composition comprising the same. More particularly, the present invention is concerned with a coated granular curing agent, which is for use in curing a radically curable compound (hereinafter, frequently referred to as a "first radically curable compound") selected from the group consisting of a radically curable resin and a radically polymerizable monomer and which comprises an organic peroxide granule, wherein the organic peroxide granule has an entire surface thereof coated with a layer of a cured resin derived from another radically curable compound (hereinafter, frequently referred to as a "second radically curable compound") which is the same as or different from the above-mentioned first radically curable compound. The present invention is also concerned with an anchor bolt-fixing composition comprising (1) a curable composition comprising at least one radically curable compound selected from the group consisting of a radically curable resin and a radically polymerizable monomer, and a cure accelerator; and (2) a plurality of granules of the above-mentioned coated granular curing agent. The coated granular curing agent of the present invention is advantageous not only in that the curing agent can be handled with ease, but also in that the curing agent can be uniformly dispersed in a radically curable compound, so that it exhibits excellent curing performance. Therefore, the coated granular curing agent of the present invention can be advantageously used as a curing agent for a radically curable resin and/or a radically polymerizable monomer, which is used in various fields, such as a water-transmitting resin mortar and a casting resin. Especially, the curing agent of the present invention can be advantageously used to provide an excellent anchor bolt-fixing composition which not only has a long life, but also is capable of fixing an anchor bolt to a base while enjoying high fixation strength.

2. Prior Art

Conventionally, as a curing agent for a radically curable resin, such as an unsaturated polyester resin, an epoxy acrylate resin or a polyester acrylate resin, various organic peroxides have been used. These organic peroxides are appropriately selected depending on various factors, such as the type of resin to be cured and the ambient temperature at the time of performing curing of the resin. When it is attempted to cure a resin at room temperature or below, the organic peroxide is frequently used in combination with a cure accelerator, such as an aromatic amine.

Radically curable resins, which can be cured using an organic peroxide as a curing agent, have been used in various fields. For example, radically curable resins are used as a resin for providing a corrosion-preventing lining, as a resin for producing a molded article by use of a metal mold and as a resin for use as a main agent for an anchor capsule. (The term "anchor capsule" used herein means a capsule used to fix an anchor bolt or an iron rod to a base, each of which is used in fixing a machine or other structures to bases, such as a rock bed, concrete and masonry.) As a resin to be used as the main agent for an anchor capsule, a radically curable resin, such as an unsaturated polyester resin or an epoxy acrylate resin, is generally used.

Conventionally, the anchor capsule comprises a curable resin in a viscous liquid form, a curing agent, and, optionally, an aggregate. The operation of fixing an anchor bolt or an iron rod to a base using such an anchor capsule is generally conducted by a method comprising inserting an anchor capsule into a hole drilled in a base, and driving an anchor bolt or an iron rod into the hole, thereby breaking the anchor capsule in the hole so as to allow the curing agent to be mixed with the curable resin in a viscous liquid form, so that the resin can be cured. Specific examples of methods for breaking an anchor capsule in a hole by means of an anchor bolt or an iron rod include: a first method, in which an anchor capsule in a hole is broken by driving the anchor bolt or the iron rod into the hole by means of a hammer; and a second method, in which an anchor capsule in a hole is broken by the rotary percussion caused by the anchor bolt or the iron rod which is driven into the hole by means of a hammer drill or the like. When the second method is employed, the anchor bolt can be fixed to the base while enjoying high fixation strength, as compared to the fixation strength achieved by the first method. Therefore, the second method is advantageous especially for fixing an anchor bolt to a base located in sea water or water, or to a base located on a shore, in which a high fixation strength is required.

In the above-mentioned second method, the below-described type of an anchor capsule is generally used. That is, such an anchor capsule has a double-wall structure comprising cylindrical outer and inner casings, each of which is breakable by the action of an anchor bolt or an iron rod when the anchor bolt or the iron rod is applied to the anchor capsule, in which a main agent comprising a curable resin in a viscous liquid form and an aggregate are disposed in a space defined by the inner wall of the outer casing and the outer wall of the inner casing, and in which the curing agent is disposed in the inner casing (see European Patent No. 0 150 555).

Further, Examined Japanese Patent Application Publication No. 4-1160 discloses an anchor bolt-fixing capsule having a double-wall structure comprising outer and inner casings, each of which is breakable by the action of an anchor bolt when the anchor bolt is applied to the capsule, which comprises the above-mentioned outer and inner casings, a curable resin in a viscous liquid form and a mixture of a solid granular curing agent and an aggregate, wherein one of the curable resin and the curing agent-aggregate mixture is disposed in the inner casing, and the other is disposed in a space defined by the inner wall of the outer casing and the outer wall of the inner casing, and wherein the solid granular curing agent and the aggregate are uniformly mixed.

However, in the above-mentioned capsules for use in an anchor bolt-fixing operation, it is requisite that a curable resin in a viscous liquid form and a curing agent be separately disposed by using a double-wall structure. Therefore, the above-mentioned capsule is disadvantageous in that not only is the production process for the above-mentioned capsules cumbersome, but also the dispersion of the curing agent in the curable resin at the anchor bolt-fixing operation is likely to become unsatisfactory and, hence, the curing of the curable resin becomes non-uniform. Further, when a capsule for use in an anchor bolt-fixing operation has a double-wall structure as mentioned above, problems arise such that an operation in which a curing agent in a powdery or granular form is packed into a casing, especially the inner casing (which has a smaller diameter than the outer casing has), is extremely cumbersome and, in addition, the fine powder of curing agent is inevitably scattered in the workshop during the packing operation, thus degrading the working environment. Also, during the packing operation, a bridging of the curing agent occurs in the packing hopper, and in the casing being packed with the curing agent, so that the operation efficiency becomes poor.

An anchor bolt-fixing capsule has been proposed, in which a rod-shaped curing agent and a mixture of a curable resin in a viscous liquid form and a granular stone aggregate are disposed in an opaque cylindrical tubular casing having an opening which is fittedly closed by a transparent plastic cap, wherein the rod-shaped curing agent is a molded product obtained by molding a mixture of a peroxide, an organic binder and a diluent, and has an entire surface thereof coated with a cured resin layer (see Examined Japanese Patent Application Publication No. 63-13000). This capsule solves the problems of such a capsule having a double-wall structure as mentioned above. However, this capsule is disadvantageous not only in that, since the curing agent used therein is in the form of a rod, the curing agent cannot be packed into the casing simultaneously with the packing of the granular stone aggregate, and the packing of the granular stone aggregate can be conducted only after the packing of the rod-shaped curing agent, thus rendering the packing operation cumbersome, but also in that during the packing of the granular stone aggregate, a bridging of the granular stone aggregate occurs between the inner wall of the tubular casing and the rod-shaped curing agent, so that the granular stone aggregate cannot be packed fully to the bottom of the casing. Further, this capsule also poses a problem such that, during the anchor bolt-fixing operation, when the anchor bolt is driven into the capsule by the rotary percussion caused by a hammer drill, the rod-shaped curing agent is broken into pieces, and the pieces will sink to the bottom of the hole (in which the anchor bolt is to be fixed), so that the mixing between the curing agent and the curable resin in a viscous liquid form becomes non-uniform. Hence, a large non-uniformity is caused in the curing of the resin, so that a high anchor bolt-fixing performance cannot be stably obtained.

There is also a proposal for an anchor bolt-fixing cartridge comprising a cylindrical cartridge having a plurality of macrocapsules disposed therein, wherein each of the macrocapsules is filled with a curable polymer, and wherein each of the macrocapsules is in contact with other macrocapsules and/or the inner wall of the cartridge so as to be packed in the cartridge in immobilized fashion (see Unexamined Japanese Patent Application Laid-Open Specification No. 55-32814). According to the method disclosed in this prior art document, the macrocapsules in the cartridge are broken into flakes by the action of an anchor bolt, and the resultant flakes function as a so-called "static agitator" for the curable polymer so that the space between the anchor bolt and the inner wall of the hole is uniformly filled with the curable polymer. However, as can be seen from the above, the macrocapsules used in this technique must be those which are breakable into flakes by the action of an anchor bolt. As such macrocapsules, for example, hollow glass balls coated with a phenol resin, fragments of a clay tube (wherein the fragments have been sealed at both ends thereof), gelatin capsules and the like are used, but materials which can be used for the macrocapsules have been limited. Accordingly, methods for introducing a curable polymer to the macrocapsules are also limited. As such methods, for example, there can be mentioned a method which comprises dipping macrocapsules in a curable liquid polymer, and degassing in situ the macrocapsules in vacuo, followed by increasing the pressure so that the macrocapsules are filled with the curable liquid polymer; and a method which comprises injecting a curable liquid polymer to the macrocapsules by means of a syringe. These methods are, however, disadvantageous because of the low productivity of final macrocapsules containing a curable polymer liquid. Further, in these methods, as can be clearly understood from the above, it is absolutely necessary to use as a curable polymer a curable liquid polymer, and a curable solid polymer, such as a solid polymer in a granular or a powder form, cannot be used.

There is also a proposal for a one-pack type curing resin composition usable as an adhesive, a sealant, a coating material, a molding material and the like, which is in the form of a dispersion of microcapsules in a mixture of a polymerizable polyfunctional acrylate compound (which is a monomer having at least two acrylic acid residues) and/or a polymerizable polyfunctional methacrylate compound (which is a monomer having at least two methacrylic acid residues) as a curing resin component with an organic peroxide as a curing agent, wherein the microcapsules contain a cure accelerator which, when combined with the organic peroxide, is capable of forming a redox polymerization reaction system for the polyfunctional acrylate compound and/or the polyfunctional methacrylate compound, and is coated with a film comprising a hydrocarbon compound capable of forming a coating (see Examined Japanese Patent Application Publication No. 54-32480). However, this one-pack type curing resin composition is disadvantageous in that a gelation of the resin component proceeds unfavorably rapidly since the curing resin component is directly in contact with the curing agent in the reaction system.

SUMMARY OF THE INVENTION

With a view toward developing an excellent curing agent for a radically curable resin and/or a radically polymerizable monomer, which curing agent is free from the above-mentioned problems, the present inventors have made extensive and intensive studies. As a result, it has unexpectedly been found that a coated granular curing agent, which is for use in curing a first radically curable compound (i.e., a radically curable resin and/or a radically polymerizable monomer) and which comprises an organic peroxide granule, wherein the organic peroxide granule has an entire surface thereof coated with a layer of a cured resin derived from a second radically curable compound which is the same as or different from the first radically curable compound, exhibits advantageous characteristics such that the curing agent can be handled with ease, and that the curing agent can be dispersed uniformly in the above-mentioned first radically curable compound, so that the curing agent exhibits excellent curing performance. It has also unexpectedly been found that the above-mentioned curing agent can be advantageously used to provide a one-pack type anchor bolt-fixing composition which is not only capable of stably fixing an anchor bolt to a base while enjoying high fixation strength, but also can be stored at room temperature for a period of time as long as 1 month or longer without suffering any degradation. Based on these novel findings, the present invention has been completed.

Accordingly, it is an object of the present invention to provide a coated granular curing agent for use in curing a radically curable compound, which can be advantageously handled with ease, and has excellent curing ability.

It is another object of the present invention to provide an anchor bolt-fixing composition, which can be stored for a prolonged period of time without suffering any degradation, and is capable of stably fixing an anchor bolt to a base while enjoying high fixation strength.

It is a further object of the present invention to provide an anchor bolt-fixing capsule comprising an anchor bolt-fixing composition having the above-mentioned excellent properties.

It is still a further object of the present invention to provide a method for advantageously producing an anchor bolt-fixing resin composition of one of the preferred embodiments of the anchor bolt-fixing resin composition of the present invention.

The foregoing and other objects, features and advantages of the present invention will be apparent from the following detailed description and appended claims, taken in connection with the accompanying drawings.

BRIEF DESCRIPTION OF THE DRAWINGS

In the accompanying drawings:

In FIG. 1 through FIG. 3, like parts or portions are designated by like numerals. In FIG. 1 through FIG. 3, the reference numerals have the following meanings.

1: Casing
2: Curable composition
3: Aggregate
4: Coated granular curing agent of the present invention
4': Conventional rod-shaped curing agent
5: Sealed portion
6: First coating layer
7: Second coating layer
8: Cap

DETAILED DESCRIPTION OF THE INVENTION

According to a basic embodiment of the present invention, there is provided a coated granular curing agent, which is for use in curing at least one first radically curable compound selected from the group consisting of a radically curable resin and a radically polymerizable monomer and which comprises an organic peroxide granule, wherein the organic peroxide granule has an entire surface thereof coated with a layer of a cured resin derived from at least one second radically curable compound selected from the group consisting of a radically curable resin and a radically polymerizable monomer, and wherein the first and second radically curable compounds are the same or different.

For an easy understanding of the present invention, the essential features and representative embodiments of the present invention are enumerated below.

The first representative embodiment of the present invention consists in: a coated granular curing agent, which is for use in curing at least one first radically curable compound selected from the group consisting of a radically curable resin and a radically polymerizable monomer and which comprises an organic peroxide granule, wherein the organic peroxide granule has an entire surface thereof coated with a layer of a cured resin derived from at least one second radically curable compound selected from the group consisting of a radically curable resin and a radically polymerizable monomer, and wherein the first and second radically curable compounds are the same or different.

The second representative embodiment of the present invention consists in: an anchor bolt-fixing composition, comprising:

(1) a curable composition comprising at least one first radically curable compound selected from the group consisting of a radically curable resin and a radically polymerizable monomer, and a cure accelerator; and (2) a plurality of granules of a coated granular curing agent for the curable composition (1), the granular curing agent comprising an organic peroxide granule, wherein the organic peroxide granule has an entire surface thereof coated with a layer of a cured resin derived from at least one second radically curable compound selected from the group consisting of a radically curable resin and a radically polymerizable monomer, wherein the first and second radically curable compounds are the same or different.

The third representative embodiment of the present invention consists in: a method for producing an anchor bolt-fixing composition as mentioned above as the second representative embodiment of the present invention, wherein the first and second radically curable compounds are the same, which comprises mixing a curable composition, which is in a viscous liquid form and which comprises at least one radically curable compound selected from the group consisting of a radically curable resin and a radically polymerizable monomer, and a cure accelerator, with a plurality of organic peroxide granules, to thereby form a layer of a cured resin on the entire surface of each of the organic peroxide granules, wherein the cured resin is derived from the radically curable compound contained in the curable composition.

Examples of organic peroxides used in the coated granular curing agent of the present invention include hydroperoxides, such as cumene hydroperoxide; dialkyl peroxides, such as dicumyl peroxide; diacyl peroxides, such as benzoyl peroxide; ketone peroxides, such as methyl ethyl ketone peroxide; oxycarbonates, such as bis(4-t-butylcyclohexyl) peroxycarbonate; peroxyketals, such as 1,1-di-t-butylperoxycyclohexanone; and peroxyesters, such as t-butyl peroxybenzoate. Among the above-mentioned organic peroxides, benzoyl peroxide is preferably used because it can be handled with ease and exhibits excellent curing performance at room temperature.

With respect to the configuration of the organic peroxide granule used in the present invention, there is no particular limitation. The organic peroxide granule may be used in various forms, such as a sphere and an ellipsoid. Also, the organic peroxide granule may have a plurality of concavo-convex portions on the surface thereof.

The organic peroxide granule can be obtained by a method comprising diluting an organic peroxide with an inorganic compound (such as calcium carbonate, calcium sulfate or the like) so that the organic peroxide concentration in the resultant mixture becomes from 1 to 95% by weight, and shaping the mixture to a granule. From the viewpoint of safety in handling, the concentration of the organic peroxide in the mixture is preferably 50% or less by weight, based on the weight of the mixture.

With respect to the method for producing an organic peroxide granule, there is no particular limitation. An organic peroxide granule may be produced by, for example, (a) a method which comprises applying a mechanical pressure to a powdery organic peroxide diluted with an inorganic compound or a wet mass of a powdery organic peroxide diluted with an inorganic compound, to thereby shape the powdery organic peroxide; (b) a method which comprises adding a shaping agent and water to a powdery organic peroxide diluted with an inorganic compound to obtain a slurry, and drying the obtained slurry; (c) a method which comprises spraying a liquid shaping agent on a powdery organic peroxide diluted with an inorganic compound to thereby cause agglomeration of the organic peroxide; or (d) a method which comprises adding water and a shaping agent to a powdery organic peroxide diluted with an inorganic compound to obtain a clay-like mixture, and shaping the obtained clay-like mixture into spherical granules by a granulating machine.

In the above-mentioned method (a), an organic peroxide is shaped into a granule without using a shaping agent.

In the above-mentioned methods (b), (c) and (d), a shaping agent is used. Examples of shaping agents which can be used in the methods (b), (c) and (d) include cellulose derivatives, such as carboxymethyl cellulose, methyl cellulose, microcrystalline cellulose (manufactured and sold under the trade name of "AVICEL" by Asahi Chemical Industry, Co., LTD, Japan), gum arabic, guar gum and locust bean gum; gelatin; polyvinyl alcohol (PVA); and starches, such as amylose and amylopectin. Among the above-mentioned shaping agents, carboxymethyl cellulose, guar gum, locust bean gum, starches (such as amylose and amylopectin) are preferred because they have an excellent shaping ability, and are capable of forming an organic peroxide granule having excellent shape retentivity. Starches (such as amylose and amylopectin) are especially preferred because they can be handled with ease and are capable of imparting sufficient mechanical strength to an organic peroxide granule to maintain the granular shape in the above-mentioned anchor bolt-fixing capsule which comprises a casing and the above-mentioned anchor bolt-fixing composition disposed in the casing, wherein the anchor bolt-fixing composition comprises a curable composition (1) and a plurality of granules (2) of the coated granule curing agent of the present invention.

With respect to the amount of the shaping agent used for the preparation of the organic peroxide granules, it is preferred that the shaping agent be used in an amount of from 0.1% to 20% by weight, more preferably from 1 to 15% by weight, based on the weight of the organic peroxide.

With respect to the diameter of the organic peroxide granule, it is preferred that the organic peroxide granule have a diameter of from 0.5 mm to 15.0 mm. When an organic peroxide granule having a diameter of smaller than 0.5 mm is used to obtain a coated granular curing agent, it is difficult to break the obtained coated granular curing agent, which also has a small diameter, by stirring or the like. Therefore, in this case, there is a danger such that the radically curable resin and/or the radically polymerizable monomer cannot be satisfactorily cured. On the other hand, when an organic peroxide granule having a diameter of larger than 15 mm is used to obtain a coated granular curing agent, disadvantages are likely to be caused during the production process of the above-mentioned anchor bolt-fixing capsule. Illustratively stated, when the production process of the anchor bolt-fixing capsule includes an operation of adding a plurality of granules (2) of the coated granular curing agent to the curable composition (1) which is contained in a casing, so as to obtain the anchor bolt-fixing composition accommodated in the casing, a bridging is likely to occur, during charging of the granules of the curing agent to the casing, in the casing at a position higher than the bottom of the casing by the agglomeration of the granules of the curing agent or the agglomeration of a mixture of the granules of the curing agent and an aggregate, so that the granules of the curing agent or the mixture of the granules of the curing agent and aggregate cannot be packed fully to the bottom of the casing. Also, when the production process of the anchor bolt-fixing capsule includes an operation of charging an anchor bolt-fixing composition comprising the above-mentioned components (1) and (2), which has been prepared in advance, to a casing, the same problem as mentioned above is likely to occur during charging of the composition into the casing. Further, for uniformly dispersing the granules of the curing agent in the curing composition (1), it is more preferred that the diameter of the organic peroxide granule be from 1 to 10 mm.

In the present invention, when the organic peroxide granule has an elliptical cross-section, the diameter of such a granule is defined as the average value of the long axis and the short axis of the cross-section of the granule. When the organic granule has a plurality of concavo-convex portions on the surface thereof, the diameter of such a granule is defined as the diameter of a sphere having the same volume as that of the granule having a plurality of concavo-convex portions, in which the volume of the granule is calculated by a known method.

With respect to the strength of the organic peroxide granule, there is no particular limitation as long as the granule is breakable by mechanical stirring by a hammer drill or the like at the time of the anchor bolt-fixing operation. However, the breakage of the coated granular curing agent comprising the organic peroxide granule should be avoided at the time of dispersing the granules (2) of the coated granular curing agent in the curable composition (1), or at the time of charging a mixture of the granules (2) of the coated granular curing agent and the granules of an aggregate into a casing for an anchor bolt-fixing capsule. Therefore, it is preferred that the organic peroxide granule have a break strength of 150 gf/cm$^2$ or more, more preferably 1 kgf/cm$^2$ or more. However, when the organic peroxide granule has extremely high break strength, the coated granular curing agent obtained using such an organic peroxide granule cannot be broken by mechanical stirring at the time of the anchor bolt-fixing operation. Therefore, it is preferred that the break strength of the organic peroxide granule does not exceed 200 kgf/cm$^2$.

The formation of the layer of a cured resin on an entire surface of the organic peroxide granule, which cured resin is derived from at least one second radically curable compound selected from the group consisting of a radically curable resin and a radically polymerizable monomer, can be conducted by a method comprising: immersing the organic peroxide granule in a mixture of the second radically curable compound, which reacts with the organic peroxide to form a cured resin, with a cure accelerator at ambient temperature (from about 20° C. to about 30° C.); and stirring the resultant mixture. After the above-mentioned operation, the organic peroxide granule having an entire surface thereof coated with the layer of a cured resin (i.e., the coated granular agent of the present invention) is taken out from the mixture of the second radically curable compound with the cure accelerator. If desired, the obtained coated granular curing agent taken out from the above-mentioned mixture may be washed with acetone or the like.

In the present invention, as already mentioned above, a "first radically curable compound" means at least one radically curable compound selected from the group consisting of a radically curable resin and a radically polymerizable monomer, which is to be cured using the coated granular curing agent of the present invention, and as mentioned above, a "second radically curable compound" means at least one radically curable compound selected from the group consisting of a radically curable resin and a radically polymerizable monomer, which is used for forming the layer of a cured resin of the coated granular curing agent of the present invention. Further, as already mentioned above, the first and the second radically curable compounds may be the same or different.

Examples of radically curable resins, each of which can be independently used as either a first or a second radically curable compound, include an epoxy acrylate resin, a polyester acrylate resin, an acrylic urethane resin and an unsaturated polyester resin. With respect to the epoxy acrylate resin, reference can be made to, for example, Examined Japanese Patent Application Publication No. 62-037076. With respect to the polyester acrylate resin, reference can be made to, for example, Examined Japanese Patent Application Publication No. 5-085720. With respect to the acrylic urethane resin, reference can be made to, for example, Examined Japanese Patent Application Publication No. 5-085719. With respect to the unsaturated polyester resin, reference can be made to, for example, Examined Japanese Patent Application Publication No. 38-12863.

Examples of radically polymerizable monomers, each of which can be independently used as either a first or a second radically curable compound, include multifunctional carboxylic esters. Specific examples of radically polymerizable monomers include ethyleneglycol dimethacrylate, n-butyl methacrylate, 2-hydroxyethyl methacrylate, benzyl methacrylate, phenoxyethyl methacrylate, diethyleneglycol dimethacrylate, triethyleneglycol dimethacrylate, 1,4-butyleneglycol dimethacrylate, trimethylolpropane trimethacrylate, dimethyl maleate, isobornyl methacrylate, butanediol dimethacrylate, and 2,2-bis[4-(methacryloxydiethoxy)phenyl]-propane.

As already mentioned above, the formation of the layer of a cured resin on the entire surface of the organic peroxide granule, which cured resin is derived from the second radically curable compound, can be conducted by a method comprising: immersing the organic peroxide granule in a mixture of the second radically curable compound with a cure accelerator at ambient temperature (from about 20° C. to about 30° C.); and stirring the resultant mixture. With respect to the amount of the second radically curable compound used in immersing the organic peroxide granule in the second radically curable resin for the purpose of forming the layer of a cured resin, there is no particular limitation. However, when the amount of the second radically curable compound is too small, it becomes impossible to form the layer of a cured resin on the entire surface of the organic peroxide granule. Therefore, it is preferred that the second radically curable compound be used in an amount of 100% by weight or more, based on the weight of the organic peroxide granule.

With respect to the cure accelerator used in the above-mentioned mixture of the second radically curable compound with the cure accelerator, which mixture is used for forming the layer of a cured resin, the same cure accelerator as used in the above-mentioned curable composition (1) of the anchor bolt-fixing composition may be employed. The function of the cure accelerator which is used in the above-mentioned mixture for forming the layer of a cured resin is to facilitate the curing of the second radically curable compound on the surface of the organic peroxide granule, to thereby form a layer of a cured resin on the entire surface of the organic peroxide granule. Examples of cure accelerators include aromatic anilines, such as N,N-dimethylaniline, N,N-diethylaniline, N,N-dimethyl-p-toluidine, N,N-dihydroxypropyl-p-toluidine, N,N-dihydroxyethyl-p-toluidine; metallic soaps, such as cobalt naphthenate; and chelate compounds, such as vanadyl acetylacetonate. With respect to the amount of the cure accelerator used in the above-mentioned mixture, there is no particular limitation. However, it is preferred that the cure accelerator be used in an amount of from 0.1 to 5% by weight, more preferably from 0.2 to 3% by weight, based on the total weight of the second radically curable compound and the cure accelerator.

With respect to the thickness of the above-mentioned layer of a cured resin, it is preferred that the thickness of the layer be as small as possible so that the coated granular curing agent is able to have a large organic peroxide content, and that, when the coated granular curing agent is used in the anchor bolt-fixing composition, the coated granular curing agent can be easily broken by the action of an anchor bolt. However, when the thickness of the layer of a cured resin is too small, the handling of the coated granular curing agent becomes disadvantageously cumbersome. Therefore, it is preferred that the thickness of the layer of a cured resin be from 0.3% to 40%, more preferably from 0.3% to 25%, based on the diameter of the coated granular curing agent.

Hereinbelow, explanation is made with respect to the anchor bolt-fixing composition of the present invention.

The anchor bolt-fixing composition of the present invention can be obtained by mixing the curable composition (1) comprising the first radically curable compound and the cure accelerator with a plurality of granules (2) of the coated granular curing agent of the present invention, wherein the granular curing agent has a layer of a cured resin derived from the second radically curable compound which is the same as or different from the first radically curable compound.

It is preferred that the anchor bolt-fixing composition of the present invention contain the granules (2) of the coated granular curing agent in an amount of from 0.5 to 20% by weight, more preferably from 2 to 15% by weight, in terms of the weight percentage of the organic peroxide, based on the weight of the curable composition (1).

In the anchor bolt-fixing composition of the present invention, the coated granular curing agent exhibits an excellent mobility. Therefore, when the anchor bolt-fixing operation is conducted using the anchor bolt-fixing composition of the present invention, even if the granules (2) of the coated granular coating agent have not been uniformly dispersed in the curable composition (1), the granules (2) are caused to be uniformly dispersed in the curable composition positioned in a space between the anchor bolt and the wall of a hole drilled in a base by stirring with a hammer drill or the like. However, for enhancing the curing performance of the curing agent, it is preferred that the granules (2) of the coated granular curing agent (2) be uniformly dispersed in the curable composition (1). The uniform dispersion of the granules (2) in the curable composition (1) can be achieved by using the coated granular curing agent and the curable composition (1) in respective amounts such that the volume ratio of the granules (2) to the curable composition (1) becomes as close to 1:1 as possible.

As already mentioned above, the first radically curable compound used in the curable composition (1) of the anchor bolt-fixing composition of the present invention may be the same as or different from the second radically curable compound used for forming the layer of a cured resin of the coated granular curing agent. However, as a first radically curable compound, it is preferred to use an epoxy acrylate resin, a polyester acrylate resin and an acrylic urethane resin, because each of these compounds not only can be advantageously used for achieving the excellent fixing ability of the anchor bolt-fixing composition, but also has excellent low-temperature curability and excellent alkali resistance As mentioned above, as a cure accelerator used in the curable composition (1), the same cure accelerator as used in the mixture of the second radically curable compound with the cure accelerator, which mixture is used for forming the layer of a cured resin of the coated granular curing agent, can be used. The cure accelerator is used in the curable composition (1) for the purpose of controlling the cure rate of the anchor bolt-fixing composition of the present invention. With respect to the amount of the cure accelerator, it is preferred that the cure accelerator be used in an amount of from 0.1 to 5% by weight, more preferably from 0.2 to 3% by weight, based on the weight of the curable composition (1). When the amount of the cure accelerator is less than 0.1% by weight, the curing rate of the radically curable compound becomes too low. In this instance, especially when the anchor bolt-fixing composition is used at a temperature lower than room temperature, there is a danger such that the curing of the radically curable compound does not proceed to a satisfactory level. When the amount of the cure accelerator exceeds 5% by weight, the curing rate of the radically curable compound becomes too high. In this instance, there is a danger such that the anchor bolt-fixing operation cannot be finished due to the extremely rapid curing of the radically curable compound. Further, for preventing occurrence of a non-cured portion remaining in the radically curable compound in conducting the anchor bolt-fixing operation at a temperature lower than room temperature, it is preferred to control the amount of the cure accelerator within the above-mentioned range, so that the cure time of the radically curable compound as measured at 25° C. according to JIS-K6901 for determining the curability at room temperature becomes 2 to 60 minutes. Further, for achieving a high fixation strength, it is more preferred that the cure time be 2 to 45 minutes.

In the present invention, the above-mentioned curable composition (1) may further comprises a monofunctional reactive monomer. Examples of monofunctional reactive monomers include styrene, methyl methacrylate, ethyl methacrylate and cyclohexyl acrylate. Each of these monofunctional reactive monomers can be used in an amount of preferably from 1 to 70% by weight, more preferably from 1 to 60% by weight, based on the weight of the curable composition (1).

In the anchor bolt-fixing composition of the present invention, it is preferred that the above-mentioned curable composition (1) further comprise an aggregate. The use of a curable composition (1) containing an aggregate is advantageous in that, in the anchor bolt-fixing operation, it becomes possible to break the coated granular curing agent into fine particles by means of the aggregate, so that the mixing of the organic peroxide contained in the coated granular curing agent with the curable composition can be efficiently performed. As a result of such an efficient mixing of the organic peroxide with the curable composition (1), it becomes possible to achieve a high hardness of the cured resin and a high fixing performance of the anchor bolt-fixing composition. As an aggregate, an inorganic substance, such as an artificial aggregate (e.g., magnesia clinker, glass or ceramic) or a natural stone (e.g., silica stone or marble) is generally used; however, an organic substance, such as a rigid polyvinyl chloride or a rigid plastic, may also be used. In the present invention, an aggregate having a relatively large size can be employed, as long as it is breakable by the rotary percussion caused by the anchor bolt in the anchor bolt-fixing operation; however, it is preferred to use a granular aggregate from the viewpoint of dispersibility of the aggregate in the curable composition (1), and ease in operations, such as an operation of mixing the aggregate with the curing agent and an operation of charging the resultant mixture to the casing. The size (diameter) of an aggregate may be appropriately chosen depending on various conditions for the anchor bolt-fixing operation (e.g., the size of the hole in which the anchor bolt is fixed and the size of the anchor bolt). With respect to the amount of the aggregate, it is preferred that the aggregate be used in an amount of from 1 to 500% by weight, more preferably from 50 to 300% by weight, based on the weight of curable composition (1).

In the present invention, if desired, an additive may be added to the curing composition (1). Examples of additives include a polymerization inhibitor, a pigment, an ultraviolet ray absorber, a surfactant, an adhesiveness-imparting agent, a filler, a thixotropic agent (such as a silica powder) and a coloring agent. These additives can be used in such amounts as are conventionally employed in the art.

The anchor bolt-fixing composition of the present invention can be advantageously produced by a method comprising mixing a curable composition, which is in a viscous liquid form and which comprises at least one radically curable compound selected from the group consisting of a radically curable resin and a radically polymerizable monomer, and a cure accelerator, with a plurality of organic peroxide granules, to form a layer of a cured resin on the entire surface of each of the organic peroxide granules, wherein the cured resin is derived from the radically curable compound contained in the curable composition, thereby forming a coated granular curing agent of the present invention in the curable composition. In this method, use is made of the same radically curable compound as the first radically curable compound to be cured by the coated granular curing agent. That is, by this method, it becomes possible to obtain an anchor bolt-fixing composition of the present invention, in which a plurality of granules (2) of the coated granular curing agent of the present invention are formed in the curable composition (1), wherein the first and second radically curable compounds are the same, simply by mixing the curable composition comprising a radically curable compound and a cure accelerator with a plurality of the organic peroxide granules. Therefore, this method is very advantageous from the viewpoint of productivity.

With respect to a method for conducting the anchor bolt-fixing operation using the anchor bolt-fixing composition of the present invention, in which each of the granules (2) of the coated granular curing agent is broken into pieces and, simultaneously with the breakage of each granule, the pieces of the granules are mixed with the curable composition (1), such a method can be conducted either in a manner such that the operation of breaking the granules (2) into pieces and, simultaneously with the breakage of the granules (2), mixing the obtained pieces with the curing composition (1) is conducted before the anchor bolt-fixing composition is charged into a hole in which the anchor bolt is intended to be fixed, or in a manner such that the above-mentioned operation is conducted after the anchor bolt-fixing composition is charged to the above-mentioned hole. In either of the above manners, by the breakage of the coated granular curing agent into pieces and the mixing of the obtained pieces with the curing composition (1), the active sites of the coated granular coating agent, which are protected by the layer of the cured resin before the breakage of the curing agent, are caused to be contacted with the curable composition (1). When the above-mentioned operation (which comprises breaking the granules (2) into pieces and, simultaneously with the breakage of the granules (2), mixing the obtained pieces with the curing composition) is intended to be conducted before the anchor bolt-fixing composition is charged into the hole, the above-mentioned operation can be conducted by, for example, a method in which a mixer is used. Alternatively, when the above-mentioned operation is intended to be conducted after the anchor bolt-fixing composition is charged into the hole, the above-mentioned operation can be conducted by, for example, a method in which the rotary percussion to be caused by the anchor bolt is utilized.

Specifically, the anchor bolt-fixing operation using the anchor bolt-fixing composition of the present invention can be conducted by a method in which the anchor bolt-fixing composition as such is charged into a hole drilled in a base material by pouring from a container or by means of a piston pump, and the anchor bolt is driven into the hole by the rotary percussion caused by a hammer drill or the like, thereby mechanically stirring the anchor bolt-fixing composition to break the granules (2) of the coated granular curing agent into pieces and mix the obtained pieces with the curable composition (1) simultaneously with the breakage of the granules (2), so that the radically curable compound is cured. However, it is preferred that the anchor bolt-fixing composition of the present invention be used in an anchor bolt-fixing capsule. With respect to such an anchor bolt-fixing capsule, it is necessary that the anchor bolt-fixing capsule comprises a casing which has a sealed construction and is breakable by the action of an anchor bolt, and an anchor bolt-fixing composition of the present invention which is contained in the casing. By using such an anchor bolt-fixing capsule containing the anchor bolt-fixing composition of the present invention, it becomes possible to place an anchor bolt-fixing composition having a desired composition of each component in the hole, so that excellent fixation strength can be stably obtained. With respect to the above-mentioned casing used in the anchor bolt fixing capsule, there is no particular limitation, as long as the casing is breakable or tearable by the rotary percussion caused by the anchor bolt during the anchor bolt-fixing operation and is capable of preventing the permeation of the first radically curable compound, cure accelerator and/or monofunctional reactive monomer through the wall of the casing to escape outside of the casing. However, a cylindrical casing made of glass, a synthetic resin, a film of synthetic resin, paper or the like, is generally used. The size of the casing is appropriately chosen depending, for example, on the size of the hole drilled in the base.

BEST MODE FOR CARRYING OUT THE INVENTION

The present invention will be described below in detail with reference to the following Examples and Comparative Examples, which should not be construed as limiting the scope of the present invention In the following Examples and Comparative Examples, evaluation was made with respect to the coated, shaped curing agents and the anchor bolt-fixing compositions in accordance with the following methods.

1) The ease of handling a coated, shaped curing agent was evaluated as follows. 10 Samples of a coated, shaped curing agent were individually allowed to fall by gravity from a height of 1.1 m, and visual observation was made to see if the samples were broken or not. From the results of the observations, evaluation of the ease of handling the coated, shaped curing agent was made according to the following criteria.

○ : no samples were broken among the 10 samples x: one or more samples were broken among the 10 samples 2) The shelf life (at room temperature) of an anchor bolt-fixing composition was determined by a method in which the number of days taken for actually causing gelation of the composition at a temperature of 60° C. were measured, and from this number of days the shelf life (months or years) of the anchor bolt-fixing composition at room temperature was obtained by calculation in accordance with the assumption that the period of 28 days taken for gelation at 60° C. is equivalent to a shelf life of 2 years at room temperature.

EXAMPLE 1

[Preparation of curable composition (A-1)]

65% by weight of a methacrylate type epoxy acrylate resin [which had been obtained by reacting a bisphenol A type epoxy resin (weight average molecular weight: 836, manufactured and sold by Showa Highpolymer Co., Ltd., Japan) with methacrylic acid in a molar ratio of 1:2] as a radically curable resin, 34% by weight of a styrene monomer as a monofunctional reactive monomer, and 1% by weight of N,N-dimethylaniline as a cure accelerator were mixed with each other, to thereby obtain curable composition (A-1). The minimum curing time for the curable composition (A-1) as measured at 25° C. in accordance with JIS-6901 for determining the curability at room temperature was about 7 minutes.

[Preparation of coated granular curing agent (B-1)]

100 Parts by weight of benzoyl peroxide, which had been diluted with calcium sulfate to a concentration of 40% by weight, 0.1 part by weight of methyl cellulose as a shaping agent, 2 parts by weight (in terms of solids content) of a styrene-butadiene (SB) latex, and 45 parts by weight of water were mixed with each other to thereby obtain a slurry. The obtained slurry was shaped into granules having a diameter of 1.5 to 3.0 mm (average diameter: 2.4 mm) at room temperature by means of a MOHNO ROBO DISPENSER (manufactured and sold by Heishin Engineering & Equipment Co., Ltd, Japan). The obtained granules were dried at 60° C. for 2 hours. Then, the dried granules were dipped in 300 cc of the curable composition (A-1) in a 500 cc-beaker, and the whole was stirred at 30° C. for 30 minutes by means of a stirrer to form a layer of a cured resin derived from curable composition (A-1) on the entire surface of each of the granules, thereby obtaining granules of coated granular curing agent (B-1). The obtained granules of the coated granular curing agent (B-1) were taken out from the curable composition (A-1) and it was visually observed that each granule had the layer of the cured resin on the entire surface thereof.

[Preparations of an anchor bolt-fixing composition and an anchor bolt-fixing capsule]

Figure 1:
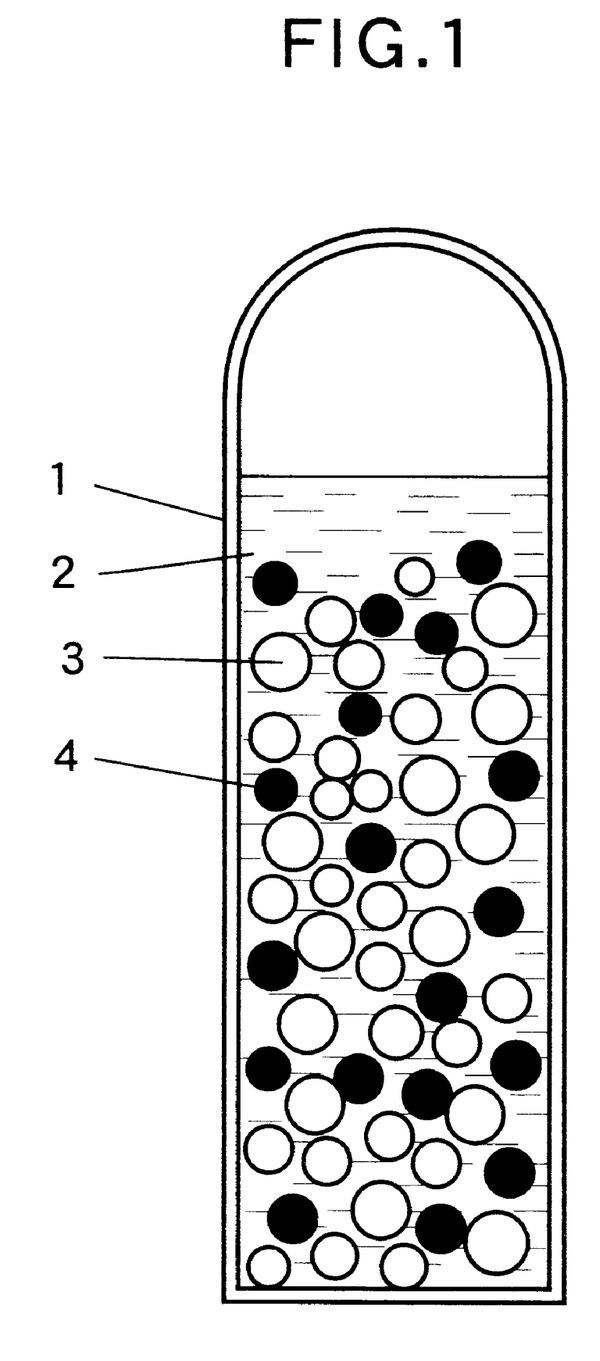
FIG. 1 is a diagrammatic cross-sectional view of an anchor bolt-fixing capsule obtained in Examples 1, 3 and 5.

8.7 g of the curable composition (A-1) was charged into a glass casing having an opening, and having an outer diameter of 17.0 mm, a wall thickness of 0.7 mm and a length of 120 mm. Then, a mixture of 24 g of magnesia clinker (as an aggregate) having a particle diameter of 1.5 to 3.0 mm and 2.0 g of the granules of the coated granular curing agent (B-1) was further charged into the glass casing, so that an anchor bolt-fixing composition was obtained in the casing. The opening of the glass casing was sealed, to thereby obtain an anchor bolt-fixing capsule as shown in FIG. 1.

A concrete block having a size of 500×500×1,000 mm and having a compression strength of 210 kg/cm$^2$ was subjected to boring to thereby make a hole having a diameter of 19.0 mm and a depth of 130 mm. The hole was cleaned by means of a blower and a nylon brush. Subsequently, the above-obtained capsule was inserted into the hole of the concrete block. A wholly threaded anchor bolt M16 (made of SNB7) having a diameter of 16 mm and having its tip end cut at 45° was securely connected at its rear end to an electric hammer drill, and the anchor bolt was driven to the bottom of the hole by the rotary percussion caused by the hammer drill. The fixation strength between the anchor bolt and the hole of the concrete block was measured one day after the anchor bolt has been driven to the bottom of the hole, by means of ANSER-5-III (manufactured and sold by Asahi Chemical Industry, Co., Ltd., Japan) which is a tensile testing machine for an anchor bolt. Results are shown in Table 1, together with the results of the evaluation of the coated granular curing agent (B-1) with respect to ease of handling. The shelf life of the anchor bolt-fixing composition was 6 months.

EXAMPLE 2

100 g of the curable composition (A-1) obtained in Example 1 was charged into a 300 cc-polyethylene container having outer diameters at the opening and bottom thereof of 69 mm and 79 mm, respectively, and a length of 96 mm. Then, 18 g of the granules of the coated granular curing agent (B-1) obtained in Example 1 were further charged into the casing, so that an anchor bolt-fixing composition was obtained in the container.

A concrete block was subjected to boring in substantially the same manner as in Example 1 to thereby make a hole therein, and 23 g of the above-obtained anchor bolt-fixing composition was poured into the hole from the container. Then, substantially the same operations as in Example 1 for driving an anchor bolt to the bottom of the hole and for measuring the fixation strength between the anchor bolt and the hole of the concrete block were conducted. Results are shown in Table 1, together with the results of the evaluation of the coated granular curing agent (B-1) with respect to ease of handling.

COMPARATIVE EXAMPLE 1

[Preparation of a rod-shaped curing agent]

1.8 g of benzoyl peroxide which had been diluted with calcium sulfate to a concentration of 40% by weight was subjected to molding using a metal mold into a rod-shaped article having a length of 80 mm and a diameter of 4.2 mm. The obtained rod-shaped article was immersed in a 40% solution of cellulose acetate in ethanol. Then, the rod-shaped article was taken out from the solution and allowed to stand at 40° C. for 1 hour, to thereby form a first coating layer of the cellulose acetate on a surface of the rod-shaped article. Then, the rod-shaped article having the first coating layer was immersed in a liquid mixture of an epoxy resin and an amine type curing agent. Then, the rod-shaped article was taken out from the liquid mixture, and allowed to stand at 30° C. for 24 hours to form a second coating layer of the epoxy resin on the first coating layer of the rod-shaped article, thereby obtaining a rod-shaped curing agent having the first and second coating layers.

[Preparation of an anchor-bolt fixing composition]

A concrete block was subjected to boring in substantially the same manner as in Example 1 to thereby make a hole therein, and 23 g of the curable composition (A-1) obtained in Example 1 was poured into the hole. Then, the above-obtained rod-shaped curing agent was inserted in the hole, thereby obtaining an anchor bolt-fixing composition in the hole. Then, substantially the same operations as in Example 1 for driving an anchor bolt to the bottom of the hole and for measuring the fixation strength between the anchor bolt and the hole of the concrete block were conducted. Results are shown in Table 1, together with the results of the evaluation of the rod-shaped curing agent with respect to ease in handling.

EXAMPLE 3

[Preparation of curable composition (A-2)]

55% by weight of a methacrylate type epoxy acrylate resin [which had been obtained by reacting a bisphenol A type epoxy resin (weight average molecular weight: 836, manufactured and sold by Showa Highpolymer Co., Ltd., Japan) with methacrylic acid in a molar ratio of 1:2], 44% by weight of diethylene glycol dimethacrylate as a radically polymerizable monomer, and 1% by weight of N,N-dihydroxypropyl-p-toluidine as a cure accelerator were mixed with each other to thereby obtain curable composition (A-2). The minimum curing time for the curable composition (A-2) as measured at 25° C. in accordance with JIS-6901 for determining the curability at room temperature was about 13 minutes.

[Preparation of coated granular curing agent (B-2)]

100 Parts by weight of benzoyl peroxide, which had been diluted with calcium sulfate to a concentration of 40% by weight, 25 parts by weight of water, and 10 parts by weight of amylopectin as a shaping agent were mixed with each other to thereby obtain a clay-like mixture. The obtained clay-like mixture was shaped into spherical granules having an average diameter of 3 mm by means of a High Performance Pill-Making Machine (manufactured and sold by Koike Iron Works, Ltd., Japan). The obtained granules were dried at room temperature for 3 hours and then at 60° C. for 1 hour. The dried granules were dipped in 300 cc of the curable composition (A-2) in a 500 cc-beaker, and the whole was stirred at 30° C. for 30 minutes by means of a stirrer to form a layer of a cured resin derived from curable composition (A-2) on the entire surface of each of the granules, thereby obtaining granules of coated granular curing agent (B-2). The obtained granules of the coated granular curing agent (B-2) were taken out from the curable composition (A-2) and it was visually observed that each granule had the layer of the cured resin on the entire surface thereof.

[Preparations of an anchor bolt-fixing composition and an anchor-bolt-fixing capsule]

An anchor bolt-fixing composition and an anchor bolt-fixing capsule were obtained in substantially the same manner as in Example 1, except that use was made of 8.7 g of the curable composition (A-2), 2.0 g of the granules of the coated granular curing agent (B-2) and 16 g of crushed silica rock (as an aggregate) having a diameter of from 1.2 to 3.4 mm. Then, an anchor bolt was fixed into a hole using the obtained anchor bolt-fixing capsule, and the fixation strength between the anchor bolt and the hole of the concrete block was measured in substantially the same manner as in Example 1. Results are shown in Table 1, together with the results of the evaluation of the coated granular curing agent (B-2) with respect to ease of handling. The shelf life of the anchor bolt-fixing composition was 2 years.

EXAMPLE 4

[Preparation of an anchor bolt-fixing composition and preparation of an anchor bolt-fixing capsule using the same]

100 Parts by weight of benzoyl peroxide, which had been diluted with calcium sulfate to a concentration of 40% by weight, 25 parts by weight of water, and 8 parts by weight of amylopectin as a shaping agent were mixed with each other to thereby obtain a clay-like mixture. The obtained clay-like mixture was shaped into spherical granules having an average diameter of 3 mm by means of a High Performance Pill-Making Machine (manufactured and sold by Koike Iron Works, Ltd., Japan). The obtained granules were dried at room temperature for 3 hours and then at 60° C. for 1 hour. The dried granules were dipped in 8.7 g of the curable composition (A-2) obtained in Example 3, which was contained in a laminate film casing having an opening (the casing was obtained by double-folding a rectangular laminate film of polyethylene/polyethylene-terephthalate/aluminum/polyethylene (length: 120 mm; width: 53.4 mm; thickness: 100 μm) along the longitudinal direction thereof, and sealing a longitudinal opening extending along the long side of the resultant double-folded rectangular film, which side is positioned opposite to the other side corresponding to the fold of the rectangular film, and one of the short-side openings of the double-folded rectangular film), thereby obtaining in the laminate film casing an anchor bolt-fixing composition having granules of the coated granular curing agent. Then, some of the granules of the coated granular curing agent were taken out from the obtained composition and it was visually observed that each of the granules of the coated granular curing agent had a layer of a cured resin on an entire surface thereof.

Figure 2:
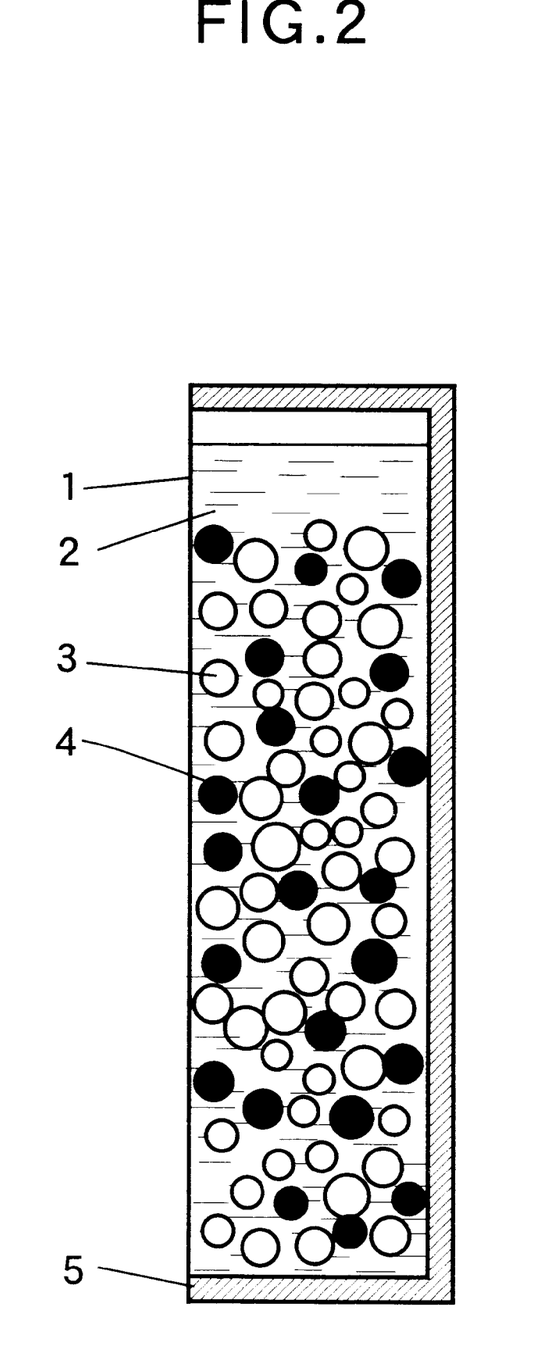
FIG. 2 is a diagrammatic cross-sectional view of an anchor bolt-fixing capsule obtained in Example 4.

The opening of the laminate film casing containing the anchor bolt-fixing composition was sealed, to thereby obtain an anchor bolt-fixing capsule as shown in FIG. 2. Then, an anchor bolt was fixed into a hole of the concrete block, using the obtained anchor bolt-fixing capsule, and the fixation strength between the anchor bolt and the hole of the concrete block was measured in substantially the same manner as in Example 1. Results are shown in Table 1, together with the results of the evaluation of the coated granular curing agent with respect to ease of handling. The shelf life of the anchor bolt-fixing capsule was more than 2 years.

EXAMPLE 5

[Preparation of coated granular curing agent (B-3)]

100 Parts by weight of benzoyl peroxide, which had been diluted with calcium sulfate to a concentration of 40% by weight, 0.1 part by weight of carboxymethyl cellulose as a shaping agent, 5 parts by weight (in terms of solids content) of a styrene-butadiene (SB) latex, and 45 parts by weight of water were mixed with each other to thereby obtain a slurry. The obtained slurry was shaped into granules having a diameter of 0.1 to 0.4 mm (average diameter: 0.25 mm) at room temperature by means of a MOHNO ROBO DISPENSER (manufactured and sold by Heishin Engineering & Equipment Co., Ltd., Japan). The obtained granules were dried at 60° C. for 2 hours. Then, the dried granules were dipped in 300 cc of the curable composition (A-2) in a 500 cc-beaker, and the whole was stirred at 30° C. for 30 minutes by means of a stirrer to form a layer of a cured resin derived from curable composition (A-2) on the entire surface of each of the granules, thereby obtaining granules of coated granular curing agent (B-3). The obtained granules of the coated granular curing agent (B-3) were taken out from the curable composition (A-2) and it was visually observed that each granule had the layer of the cured resin on the entire surface thereof.

[Preparations of an anchor bolt-fixing composition and an anchor bolt-fixing capsule]

An anchor bolt-fixing composition and an anchor bolt-fixing capsule were obtained in substantially the same manner as in Example 1, except that use was made of 2.0 g of the granules of the coated granular curing agent (B-3). Then, an anchor bolt was fixed into a hole of the concrete block, using the obtained anchor bolt-fixing capsule, and the fixation strength between an anchor bolt and the hole of the concrete block was measured in substantially the same manner as in Example 1. Results are shown in Table 1, together with the results of the evaluation of the coated granular curing agent (B-3) with respect to ease of handling.

COMPARATIVE EXAMPLE 2

Figure 3:
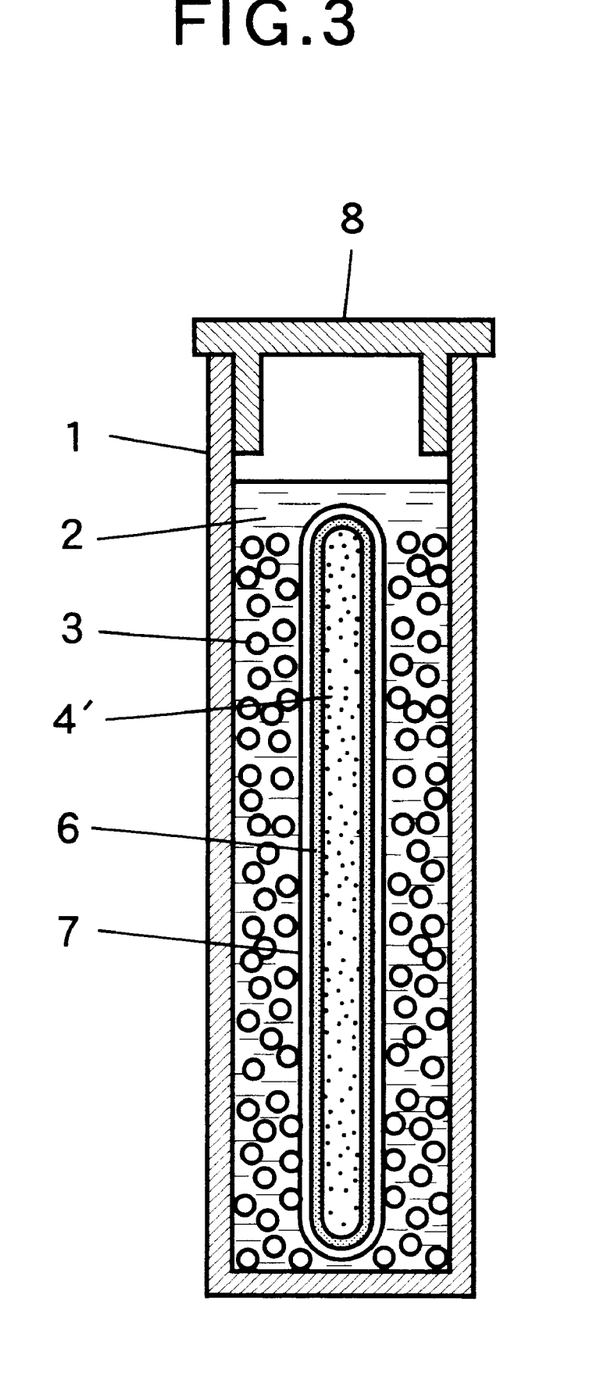
FIG. 3 is a diagrammatic cross-sectional view of an anchor bolt-fixing capsule obtained in Comparative Example 2.

8.7 g of the curable composition (A-1) obtained in Example 1 was charged into an opaque cylindrical phenol-resin tube having an opening, and having an outer diameter of 17.0 mm, a wall thickness of 0.8 mm and a length of 130 mm. Then, a rod-shaped curing agent obtained in substantially the same manner as in Comparative Example 1 was inserted into the above-mentioned tube. Subsequently, 24 g of magnesia clinker having a diameter of 1.5 mm to 3.0 mm (average diameter 2.4 mm) as an aggregate was further charged into the above-mentioned tube and then the opening of the tube was sealed by means of a polyethylene cap, to thereby obtain an anchor bolt-fixing capsule as shown in FIG. 3. Then, an anchor bolt was fixed into a hole of the concrete block, using the obtained anchor bolt-fixing capsule, and the fixation strength between the anchor bolt and the hole of the concrete block was measured in substantially the same manner as in Example 1. Results are shown in Table 1, together with the results of the evaluation of the rod-shaped curing agent (A-1) with respect to ease of handling. The shelf life of the anchor bolt-fixing capsule was 4 months.

TABLE 1

| | Fixation strength (ton) | | | Ease of handling of coated, shaped curing agent |
|---|---|---|---|---|
| | Anchor bolt-fixation test No. | Measurement value | Average of the measurement values | |
| Example 1 | 1 | 11.5 | 11.5 | ○ |
| | 2 | 11.2 | | |
| | 3 | 11.8 | | |
| Example 2 | 1 | 7.6 | 7.7 | ○ |
| | 2 | 8.0 | | |
| | 3 | 7.5 | | |
| Comparative Example 1 | 1 | 6.5 | 5.5 | X |
| | 2 | 3.2 | | |
| | 3 | 5.8 | | |
| Example 3 | 1 | 12.1 | 11.7 | ○ |
| | 2 | 11.4 | | |
| | 3 | 11.5 | | |
| Example 4 | 1 | 11.8 | 11.8 | ○ |
| | 2 | 11.9 | | |
| | 3 | 11.8 | | |
| Example 5 | 1 | 11.0 | 10.5 | ○ |
| | 2 | 10.1 | | |
| | 3 | 10.4 | | |
| Comparative Example 2 | 1 | 10.8 | 9.5 | X |
| | 2 | 8.6 | | |
| | 3 | 9.2 | | |

INDUSTRIAL APPLICABILITY

The coated granular curing agent of the present invention is advantageous not only in that the curing agent can be handled with ease, but also in that the curing agent can be uniformly dispersed in a radically curable compound, so that it exhibits excellent curing performance. Therefore, the coated granular curing agent of the present invention can be advantageously used as a curing agent for a radically curable resin and/or a radically polymerizable monomer, which is used in various fields, such as a water-transmitting resin mortar and a casting resin. Especially, the curing agent of the present invention can be advantageously used to provide an excellent anchor bolt-fixing composition which not only has a long life, but also is capable of fixing an anchor bolt to a base while enjoying high fixation strength.

We claim:

1. A coated granular curing agent, which is for use in curing at least one first radically curable compound selected from the group consisting of a radically curable resin and a radically polymerizable monomer and which comprises an organic peroxide granule, wherein said organic peroxide granule has an entire surface thereof coated with a layer of a cured resin derived from at least one second radically curable compound selected from the group consisting of a radically curable resin and a radically polymerizable monomer, and wherein said first and second radically curable compounds are the same or different.

2. The curing agent according to claim 1, wherein each of said first and second radically curable compounds is independently selected from the group consisting of an epoxy acrylate resin, a polyester acrylate resin, an acrylic urethane resin, an unsaturated polyester resin, a multifunctional carboxylic ester and a mixture thereof.

3. The curing agent according to claim 1, wherein said organic peroxide granule comprises at least one organic peroxide selected from the group consisting of a hydroperoxide, a dialkyl peroxide, a diacyl peroxide, a ketone peroxide, an oxycarbonate, a peroxyketal and a peroxyester.

4. The curing agent according to claim 1, wherein said curing agent has a diameter of from 0.5 to 15.0 mm, and the thickness of said layer of the cured resin is 0.3 to 40%, based on the diameter of said curing agent.

5. An anchor bolt-fixing composition, comprising:
   (1) a curable composition comprising at least one first radically curable compound selected from the group consisting of a radically curable resin and a radically polymerizable monomer, and a cure accelerator; and
   (2) a plurality of granules of a coated granular curing agent for said curable composition (1), said granular curing agent comprising an organic peroxide granule, wherein said organic peroxide granule has an entire surface thereof coated with a layer of a cured resin derived from at least one second radically curable compound selected from the group consisting of a radically curable resin and a radically polymerizable monomer,
   wherein said first and second radically curable compounds are the same or different.

6. The composition according to claim 5, wherein said plurality of granules (2) are present in an amount of from 0.5 to 20% by weight, based on the weight of said curable composition (1).

7. The composition according to claim 5, wherein each of said first and second radically curable compounds is independently selected from the group consisting of an epoxy acrylate resin, a polyester acrylate resin, an acrylic urethane resin, an unsaturated polyester resin, a multifuctional carboxylic ester and a mixture thereof.

8. The composition according to claim 5, wherein said first and second radically curable compounds are the same.

9. The composition according to claim 5, wherein said organic peroxide granule comprises at least one organic peroxide selected from the group consisting of a hydroperoxide, a dialkyl peroxide, a diacyl peroxide, a ketone peroxide, an oxycarbonate, a peroxyketal and a peroxyester.

10. The composition according to claim 5, wherein each of said granules (2) independently has a diameter of from 0.5 to 15.0 mm, and wherein the layer of said cured resin of each of said granules (2) independently has a thickness of from 0.3 to 40%, based on the diameter of each granule.

11. The composition according to claim 5, wherein said curable composition (1) further comprises an aggregate.

12. An anchor bolt-fixing capsule comprising a casing having a sealed construction and an anchor bolt-fixing composition according to claim 5 which is contained in said casing, said casing being breakable by the action of an anchor bolt when the anchor bolt is applied to the capsule.

13. A method for producing an anchor bolt-fixing composition according to claim 8, comprising mixing a curable composition, which is in a viscous liquid form and which comprises at least one radically curable compound selected from the group consisting of a radically curable resin and a radically polymerizable monomer, and a cure accelerator, with a plurality of organic peroxide granules, to thereby form a layer of a cured resin on the entire surface of each of said organic peroxide granules, wherein said cured resin is derived from said radically curable compound contained in the curable composition.

14. The method according to claim 13, wherein said curable composition further comprises an aggregate.

* * * * *